United States Patent [19]
Jackson et al.

[11] 4,198,030
[45] Apr. 15, 1980

[54] FLUID OPERATED VALVE POSITIONER

[75] Inventors: Byron L. Jackson; Richard F. Caldwell, both of Knoxville, Tenn.

[73] Assignee: Robertshaw Controls Company, Richmond, Va.

[21] Appl. No.: 804,599

[22] Filed: Jun. 8, 1977

[51] Int. Cl.[2] ................. F16K 31/165; F16K 37/00; F02M 25/06
[52] U.S. Cl. ........................... 251/61.5; 137/554; 123/119 A
[58] Field of Search .......... 251/61.5, 61.2, 61.3, 251/61.4; 137/505.41, 505.42, 530, 554; 267/174, 175; 123/119 A; 200/835 A, 835 P; 92/5 R; 91/1; 73/714, 715

[56] References Cited

U.S. PATENT DOCUMENTS

| | | | |
|---|---|---|---|
| B 428,877 | 1/1976 | Bauer et al. | 200/83 SA |
| 1,143,338 | 6/1915 | Wesener | 73/715 |
| 2,912,536 | 10/1959 | Hoch | 92/5 R |
| 3,013,790 | 12/1961 | Anderson et al. | 267/175 |
| 3,160,836 | 12/1964 | Farley | 92/5 R |
| 3,303,755 | 2/1967 | Linker et al. | 91/1 |
| 3,326,089 | 6/1967 | Machadoo | 92/5 R |
| 3,390,943 | 7/1968 | Myers | 137/554 |
| 3,659,499 | 5/1972 | Woodward | 91/1 |
| 3,850,196 | 11/1974 | Fales | 137/554 |
| 3,974,807 | 8/1976 | Nohira et al. | 123/119 A |
| 4,009,642 | 3/1977 | Vanderlaan | 91/363 A |
| 4,052,969 | 10/1977 | Ando et al. | 251/61.5 |

FOREIGN PATENT DOCUMENTS 2321731  11/1973  Fed. Rep. of Germany .......... 251/61.5

Primary Examiner—Irwin C. Cohen
Assistant Examiner—A. Michael Chambers
Attorney, Agent, or Firm—Candor, Candor & Tassone

[57] ABSTRACT

A fluid operated valve positioner having an actuator unit provided with a flexible diaphragm carrying a main valve member to position the same relative to its main valve seat in a valve unit in relation to the actuated position of the diaphragm, the actuating unit having a range spring acting on one side of the diaphragm and a fluid pressure chamber for receiving fluid pressure to act on the other side of the diaphragm. The actuating unit carries a position sensing member for sensing the position of the diaphragm. A tubular sleeve adjustably carries the sensing member and has a part thereof acting against the range spring to calibrate the same, the actuator unit having a tubular portion telescopically receiving the tubular sleeve therein and in an adjustable manner to calibrate the range spring and thereafter being fastened to the tubular sleeve to hold the tubular sleeve in its calibrated position.

10 Claims, 4 Drawing Figures

FLUID OPERATED VALVE POSITIONER

This invention relates to an improved fluid operated valve positioner and to a method of making the same or the like.

It is known to provide a fluid operated valve positioner having an actuator unit provided with a flexible diaphragm carrying a main valve member to position the same relative to its main valve seat in a valve unit in relation to the actuated position of the diaphragm relative to the actuator unit, the actuating unit having a range spring acting on one side of the diaphragm and a fluid pressure chamber for receiving fluid pressure to act on the other side of the diaphragm together with a position sensing means carried by the actuator unit for sensing the position of the diaphragm relative to the actuator unit.

It is also known to provide means for calibrating the range spring of an actuator unit by applying a certain pressure to the actuator chamber thereof and moving a spring retainer of the range spring relative to the actuator unit to a desired calibrated position and thereafter fasten the spring retainer to the actuator unit in its calibrated position. For example, see the U.S. Pat. to Bauer et al, No. 3,984,649 for such a range spring adjustment arrangement.

It is also known to provide means for adjusting a position sensor means relative to the actuator unit so as to zero in the sensing means for a particular setting of the actuator diaphragm.

However, it was found according to the teachings of this invention that an adjustable tubular sleeve can be provided for such an actuator unit of a valve positioner to provide a dual purpose, namely, to provide means for calibrating the range spring thereof and to provide means for adjustably carrying the sensor means for sensing the position of the diaphragm thereof.

In particular, one embodiment of this invention provides a tubular sleeve adjustably carrying the sensor means of the aforementioned fluid operated valve positioner and having a part thereof acting against the range spring thereof, the actuator unit having a tubular portion telescopically receiving the tubular sleeve therein in an adjustable manner whereby the tubular sleeve can be adjusted relative to the tubular portion to calibrate the range spring and thereafter be fastened to the tubular portion to be held in its calibrated position.

Accordingly, it is an object of this invention to provide an improved fluid operated valve positioner having one or more of the novel features of this invention as set forth above or hereinafter shown or described.

Another object of this invention is to provide a method of making such a fluid operated valve positioner or the like, the method of this invention having one or more of the novel features of this invention as set forth above or hereinafter shown or described.

Other objects, uses and advantages of this invention are apparent from the reading of this description which proceeds with reference to the accompanying drawings forming a part thereof and wherein.

Figure 1:
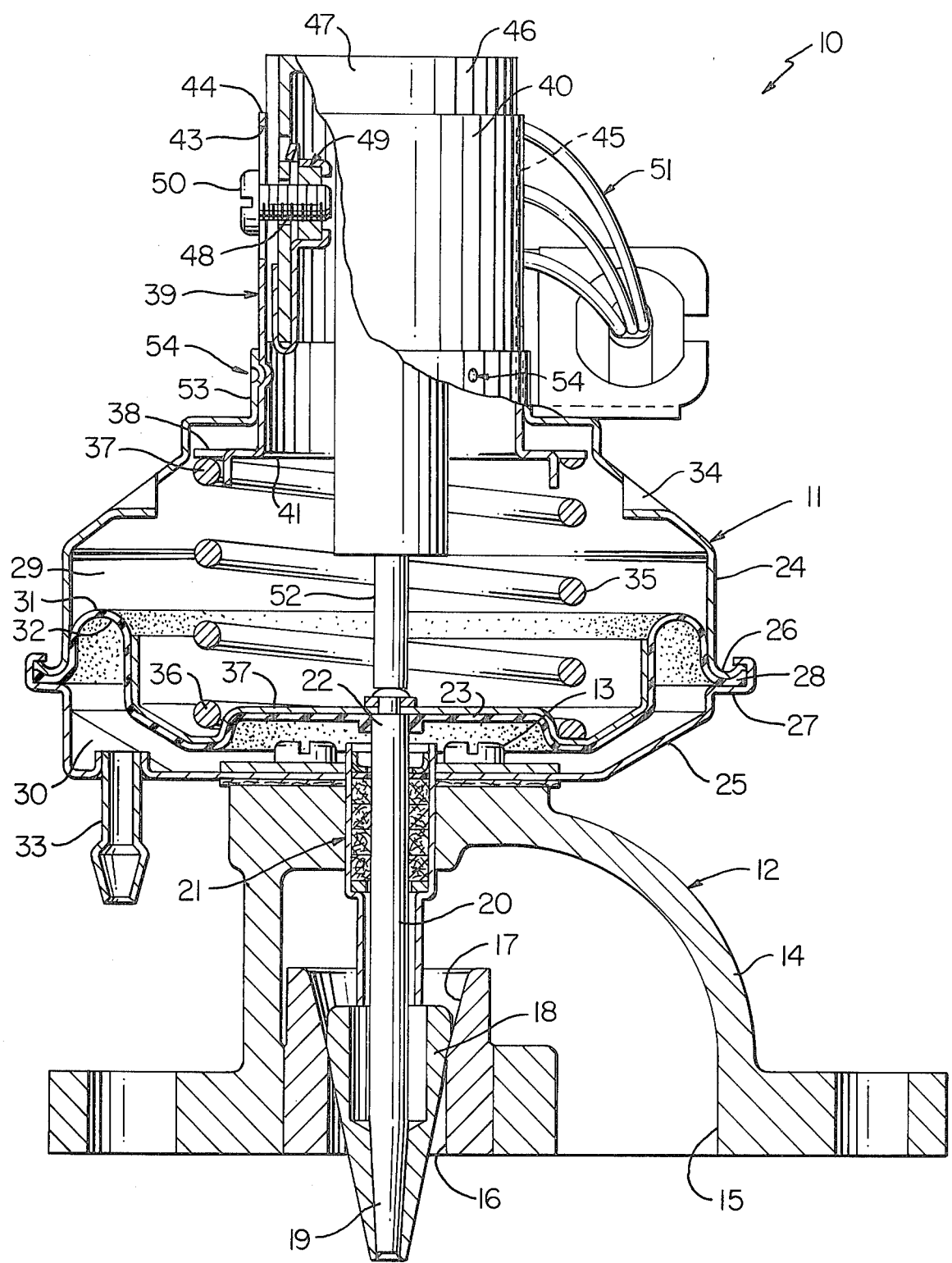
FIG. 1 is a cross-sectional view, partially in elevation, illustrating the improved fluid operated valve positioner of this invention.

While the various features of this invention are hereinafter described and illustrated as being particularly adapted to provide a fluid operated valve positioner of a type to provide for recirculating exhaust gas of an internal combustion engine back to the intake manifold thereof, it is to be understood that the various features of this invention can be utilized singly or in any combination thereof to provide a fluid operated valve positioner for other apparatus as desired.

Therefore, this invention is not to be limited to only the embodiment illustrated in the drawings, because the drawings are merely utilized to illustrate one of the wide variety of uses of this invention.

Referring now to FIG. 1, the improved fluid operated valve positioner of this invention is generally indicated by the reference numeral 10 and comprises an actuator unit that is generally indicated by the reference numeral 11 secured to a main valve unit that is generally indicated by the reference numeral 12 by suitable fastening means, such as the threaded fastening means 13 illustrated in FIG. 1.

The main valve means 12 comprises a housing means 14 having an inlet 15 and an outlet 16 separated from each other by a frusto-conical valve seat 17 adapted to be opened and closed by a main valve member 18 carried on one end 19 of a valve stem 20 that extends through suitable seal means that is generally indicated by the reference numeral 21 and has its other end 22 fastened to a flexible diaphragm 23 carried by the actuator unit 11.

Because the seal means 21 is fully disclosed and claimed in the copending patent application, Ser. No. 804598 filed June 8, 1978 and does not form part of this invention, the details thereof need not be set forth in this application as such copending patent application can be referred to should it be desired to obtain information on the details of the seal means 21.

Thus, it can be seen that the valve stem 20 is adapted to axially move upwardly and downwardly in the seal means 21 as the diaphragm 23 moves upwardly and downwardly in the actuator unit 11 in a manner hereinafter described whereby the valve member 18 can be positioned by the diaphragm 23 in various positions relative to the valve seat 17 for a purpose hereinafter described while the seal means 21 prevents fluid communication between the valve unit 12 and the actuator unit 11 for the reasons set forth in the aforementioned copending patent application.

The actuator unit 11 comprises a pair of cup-shaped housing members 24 and 25 respectively having their open ends 26 and 27 secured together in the crimped manner illustrated to not only secure the housing members 24 and 25 together, but also to fasten the outer peripheral portion 28 of the flexible diaphragm 23 therebetween so that the flexible diaphragm 23 cooperates respectively with the housing means 24 and 25 to define chambers 29 and 30 on opposite sides 31 and 32 of the flexible diaphragm 23.

The chamber 30 of the actuator unit 11 comprises an actuator chamber as the same is adapted to receive fluid pressure through an inlet nipple means 33 of the housing member 25, the nipple means 33 being adapted to be interconnected by flexible conduit means or the like to a signal pressure generating source (not shown) with such source being controlled electrically or pneumatically as desired so as to provide certain different fluid pressures within the chamber 30 to position the valve member 18 relative to the valve seat 17 in different positions for the purposes set forth in the aforementioned copending patent application as well as hereinafter described.

The chamber 29 of the actuator unit 11 comprises an atmospheric chamber as the same is interconnected to the atmosphere by vent openings 34 formed through the cup-shaped housing member 24 as illustrated.

Figure 2:
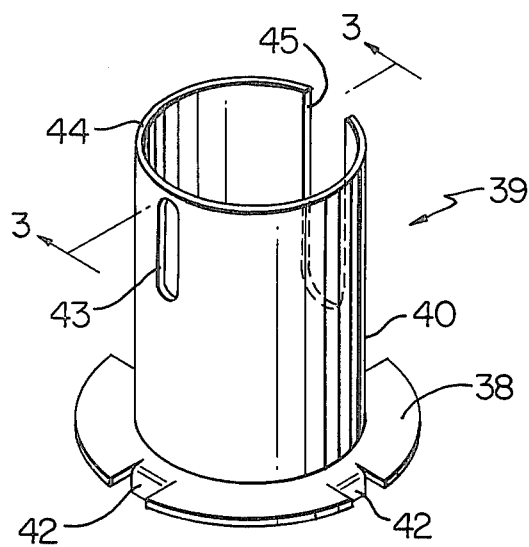
FIG. 2 is a top perspective view of the improved tubular sleeve of this invention utilized in the fluid operated valve positioner of FIG. 1.
Figure 3:
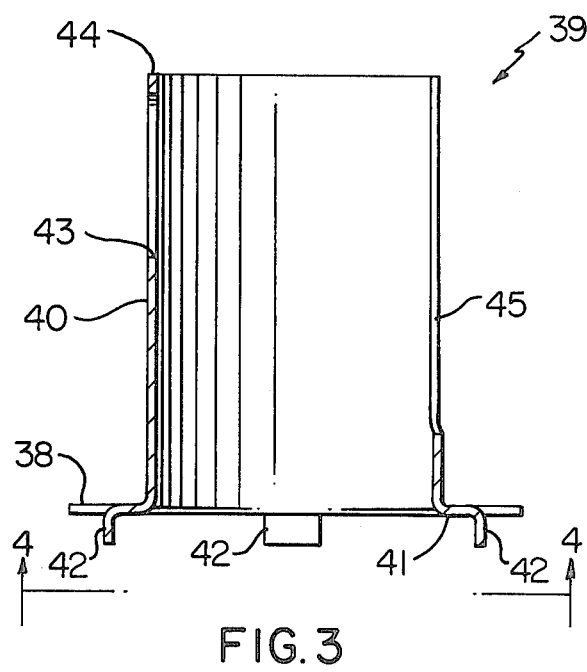
FIG. 3 is an enlarged cross-sectional view taken on line 3—3 of FIG. 2.
Figure 4:
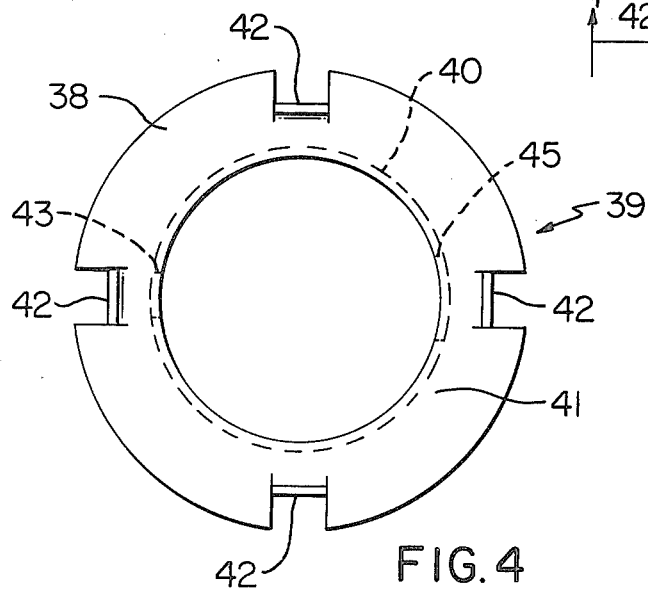
FIG. 4 is an end view of the sleeve illustrated in FIG. 3 and is taken in the direction of the arrows 4—4 thereof.

A range spring 35 is disposed in the atmospheric chamber 29 of the actuator unit 11 and comprises a coiled compression spring having one end 36 thereof bearing against a diaphragm retainer 37 fastened to the side 31 of the flexible diaphragm 23 while the other end 37 of the spring 35 bears against an annular flange 38 of an adjustable tubular sleeve 39 of this invention which is best illustrated in FIGS. 2-4.

As illustrated in FIGS. 2-4, the adjustable sleeve 39 of this invention comprises a tubular body portion 40 of substantially a cylindrical configuration and having the annular flange 38 thereof integrally formed at the lower open end 41 thereof in such a manner that the annular flange 38 extends outboard of the cylindrical body portion 40 thereof and is disposed substantially transverse relative thereto.

A plurality of tabs 42 are carved from the annular flange 38 of the sleeve 39 so as to be bent downwardly from the annular flange 38 thereof and be adapted to be received in the upper end 37 of the range spring 35 to positively locate the upper end 37 of the compression spring 35 against the annular flange 38 of the sleeve 39.

The body portion 40 of the sleeve 39 of this invention has an elongated slot 43 formed therethrough adjacent the upper open end 44 thereof as well as a larger elongated slot 45 that intersects with the open end 44 as illustrated.

In this manner, a conventional position sensing means 46 is adapted to be adjustably carried by the sleeve 39 of this invention.

For example, the position sensing means 46 can comprise a conventional linear potentiometer that has a body portion 47 adapted to be telescopically disposed within the cylindrical body portion 40 of the sleeve 39 and be fastened in the desired telescopic position therein by a threaded fastening member 48 that passes through the slot 43 of the sleeve 39 and is threadedly received in a threaded nut means 49 carried by the body portion 47 of the sensing means 46 as illustrated in FIG. 1, the threaded fastening means 48 having an enlarged head 50 adapted to compact against the cylindrical body portion 40 of the sleeve 39 when the threaded fastening member 48 is tightened to positively hold the sensing means 46 in the desired adjusted position within the sleeve 39.

Since the sensing means 46 is adapted to send an electrical position signal, the electrical lines for the sensing means 46 are generally indicated by the reference numeral 51 in FIG. 1 and are adapted to pass from the sensing means 46 out through an elongated slot 45 of the sleeve 39 in the manner illustrated.

It can be seen that the sensing means 46 projects out of the opposed open ends 41 and 44 of the sleeve 39 with the projecting part 52 of the sensing means 46 comprising a movable plunger member that is adapted to engage against the end 22 of the stem 20 of the valve member 18 to follow the movement thereof so as to effectively sense the position of the diaphragm 23 of the actuator unit 11 in a manner well known in the art.

The body portion 40 of the sleeve 39 is adapted to be telescopically received through a tubular portion 53 of the housing member 24 of the actuator unit 11 and be fastened thereto in a manner hereinafter described.

Therefore, it can be seen that the fluid operated valve positioner 10 of this invention can be formed of relatively few parts that are adapted to be assembled together according to the method of this invention in a manner now to be described.

After the valve unit 12 and actuator unit 11 have been assembled together in the manner illustrated in FIG. 1 with the range spring 35 having been disposed in the chamber 29 to have the end 36 thereof bear against the diaphragm 23 and the other end 37 thereof bear against the annular flange 38 of the sleeve 39 before the sleeve 39 is fastened to the tubular portion 53 of the cup-shaped housing 24 that telescopically receives the body portion 40 of the sleeve 39 in the manner illustrated in FIG. 1, the sleeve 39 can be axially adjusted relative to the tubular portion 53 of the housing member 24 to calibrate the force of the range spring 35 either before or after the sensing means 46 has been initially assembled thereto by the fastening means 48 as desired.

In any event, in order to calibrate the range spring 35, a fluid pressure signal of a certain predetermined force is supplied to the diaphragm chamber 30 through the inlet nipple means 33 and while maintaining such predetermined pressure signal in the chamber 30, the sleeve 39 is axially adjusted in the tubular portion 53 of the housing member 24 to cause the range spring 35 to change its force thereof acting on the diaphragm 23 in opposition to the force of the pressure signal in the actuating chamber 30 until the valve member 18 just begins to open the valve seat 17. At this point, the sleeve 39 is fastened to the tubular portion 53 of the housing means 24, such as through a staking of the tubular portion 53 of the housing member 24 to the body portion 40 of the sleeve 39 in a plurality of places as represented by the reference numeral 54 in FIG. 1 whereby the range spring 35 is positively calibrated by the sleeve 39 during the assembly operation of the valve positioner 10.

Thereafter, the position sensing means 46 is axially adjusted in the body portion 40 of the sleeve 39 to set the zero point thereof to measure the position of the diaphragm 23 at the time the valve member 18 is just beginning to open the valve seat 17 in the manner previously described. At this point, the sensing means 46 is then locked in place by a tightening of the fastening member 48 whereby the assembly of the fluid operated valve positioner 10 of this invention is completed and is adapted to operate in a manner now to be described.

As long as the force of the pressure signal being directed to the actuating chamber 30 of the actuator unit 11 of the valve positioner 10 of this invention is of a force that is insufficient to overcome the force of the range spring 35 holding the valve member 18 closed against the valve seat 17, no fluid flow can take place between the inlet 15 and the outlet 16 of the main valve unit 12. However, when the force of the pressure signal in the actuating chamber 30 increases to a point where the same can move the disphragm 23 upwardly in opposition to the force of the compression spring 35 to a certain position relative to the actuator unit 11, such upward movement of the diaphragm 23 carries the valve member 18 therewith so as to open the valve seat 17 to provide a certain flow of fluid from the inlet to the outlet 16 thereof. Such position of the diaphragm 23 is sensed by the sensing means 46 which sends a signal of the position of the diaphragm means 23 through the wire means 51 in a manner well known in the art for any desired control purpose or the like.

A further increase in the pressure in the chamber 30 of the actuator unit 11 will cause the diaphragm 23 to further move upwardly and further open the valve member 18 relative to the valve seat 17 to increase the fluid flow between the inlet 15 and the outlet 16 thereof.

Conversely, a decrease in the pressure signal in the actuating chamber 30 of the actuator unit 11 will permit range spring 35 to move the diaphragm 23 downwardly to a new position thereof to close the valve member 18 toward the valve seat 17 and thereby reduce the fluid flow between inlet 15 and outlet 16 thereof whereby the fluid operated valve positioner 10 of this invention is adapted to provide different levels of fluid flow between the inlet 15 and outlet 16 thereof depending upon the magnitude of the pneumatic signal being directed to the actuating chamber 30 of the actuator unit 11 for any desired purpose. For example, the fluid operated valve positioner 10 of this invention can be utilized for the purpose of recirculating exhaust gases from an automobile internal combustion engine back to the intake manifold thereof for the reasons fully advanced in the copending patent application, Ser. No. 800211 filed May 25, 1977 now U.S. Pat. No. 4,099,539 issued July 11, 1978.

Therefore, it can be seen that this invention not only provides an improved fluid operated valve positioner or the like, but also this invention provides an improved method of making such a fluid operated valve positioner or the like.

While the form and method of this invention, now preferred, have been illustrated and described as required by the Patent Statute, it is to be understood that other forms and method steps can be utilized and still fall within the scope of the appended claims.

What is claimed is:

1. In a fluid operated valve positioner having an actuator unit provided with flexible diaphragm means carrying a main valve member to position the same relative to its main valve seat in a valve unit in relation to the actuated position of said diaphragm means in said actuator unit, said actuator unit having a range spring acting on one side of said diaphragm means and a fluid pressure chamber for receiving fluid pressure to act on the other side of said diaphragm means, said actuator unit carrying a position sensing means for sensing the position of said diaphragm means relative to said actuator unit, the improvement comprising a tubular sleeve adjustably carrying said sensing means and also having a part thereof acting against said range spring to calibrate the same, said actuator unit having a tubular portion telescopically receiving said tubular sleeve therein in an adjustable manner to calibrate said range spring and including means to fasten said tubular sleeve to said tubular portion of said actuator unit to hold said tubular sleeve in its calibrated position.

2. A fluid operated valve positioner as set forth in claim 1 wherein said part of said tubular sleeve comprises an annular flange carried by said tubular sleeve.

3. A fluid operated valve positioner as set forth in claim 2 wherein said tubular sleeve has opposed open ends, said annular flange being at one of said open ends and being substantially transverse relative to said tubular sleeve.

4. A fluid operated valve positioner as set forth in claim 3 wherein said annular flange extends outboard of said tubular sleeve.

5. A fluid operated valve positioner as set forth in claim 4 wherein said range spring comprises a coiled compression spring having opposed ends one of which engages said annular flange of said tubular sleeve.

6. A fluid operated valve positioner as set forth in claim 5 wherein said annular flange of said tubular sleeve has a plurality of tabs extending therefrom and being received in said one end of said coiled compression spring to position the same relative to said annular flange.

7. A fluid operated valve positioner as set forth in claim 6 wherein said tabs of said tubular sleeve are carved from said annular flange thereof.

8. A fluid operated valve positioner as set forth in claim 1 wherein said means fastening said tubular portion of said actuator unit and said tubular sleeve together comprises staked portions thereof.

9. A fluid operated valve positioner as set forth in claim 1 wherein said sensing means has a part thereof disposed inside said tubular sleeve.

10. A fluid operated valve positioner as set forth in claim 9 wherein said tubular sleeve has opposed open ends, said sensing means having a portion thereof that projects out of one of said ends of said tubular sleeve and engages said one side of said diaphragm means.

* * * * *